US012528092B2

(12) United States Patent
Ebert et al.

(10) Patent No.: US 12,528,092 B2
(45) Date of Patent: Jan. 20, 2026

(54) METHOD FOR PROCESSING EXPLOSIVE PRODUCTS IN A SEPARATING MACHINE, AND SEPARATING MACHINE

(71) Applicant: FLOTTWEG SE, Vilsbiburg (DE)

(72) Inventors: Alexander Ebert, Vilsheim (DE); Sebastian Gillig, Freising (DE); Philipp Sedlmeier, Vilsbiburg (DE); Markus Steibel, Freising (DE); Ingrid Strell, Velden (DE); Benno Vielhuber, Vilsbiburg (DE)

(73) Assignee: FLOTTWEG SE, Vilsbiburg (DE)

( * ) Notice: Subject to any disclaimer, the term of this patent is extended or adjusted under 35 U.S.C. 154(b) by 771 days.

(21) Appl. No.: 17/784,757

(22) PCT Filed: Dec. 17, 2020

(86) PCT No.: PCT/EP2020/086605
§ 371 (c)(1),
(2) Date: Jun. 13, 2022

(87) PCT Pub. No.: WO2021/122870
PCT Pub. Date: Jun. 24, 2021

(65) Prior Publication Data
US 2023/0001430 A1 Jan. 5, 2023

(30) Foreign Application Priority Data
Dec. 19, 2019 (DE) ..................... 10 2019 135 218.5

(51) Int. Cl.
*B04B 15/02* (2006.01)
*B04B 1/08* (2006.01)
(Continued)

(52) U.S. Cl.
CPC ................ *B04B 15/02* (2013.01); *B04B 1/08* (2013.01); *B04B 1/20* (2013.01); *B04B 13/00* (2013.01)

(58) Field of Classification Search
CPC .. B04B 15/02; B04B 1/08; B04B 1/20; B04B 13/00; B04B 7/06
(Continued)

(56) References Cited

U.S. PATENT DOCUMENTS

| | | | | |
|---|---|---|---|---|
| 392,454 | A | 11/1888 | Peck | 494/14 |
| 2,000,521 | A | 5/1935 | Jones | 494/37 |

(Continued)

FOREIGN PATENT DOCUMENTS

| | | | | |
|---|---|---|---|---|
| CN | 208642991 U | 3/2019 | | B04B 15/02 |
| EP | 0058353 A1 | 8/1982 | | B01D 19/00 |

(Continued)

OTHER PUBLICATIONS

An Office Action (in Hindi and English), dated Dec. 1, 2022, issued by the Indian Patent Office for Applicant's related Indian Patent Application No. IN202217039958, filed Jul. 12, 2022.

(Continued)

*Primary Examiner* — Duane Smith
*Assistant Examiner* — Shuyi S. Liu
(74) *Attorney, Agent, or Firm* — Bodner & Bodner, PLLC; Christian P. Bodner; Gerald T. Bodner

(57) ABSTRACT

The invention relates to a method for processing explosive products in a separating machine (10) which comprises a rotary apparatus (30) located in a drum (20), wherein the drum (20) is located in a machine housing (40). According to the invention, a cooling liquid is applied, in particular sprayed, onto an outer surface (21) of the drum (20), at least onto portions thereof and/or intermittently, during process-
(Continued)

Figure 1:
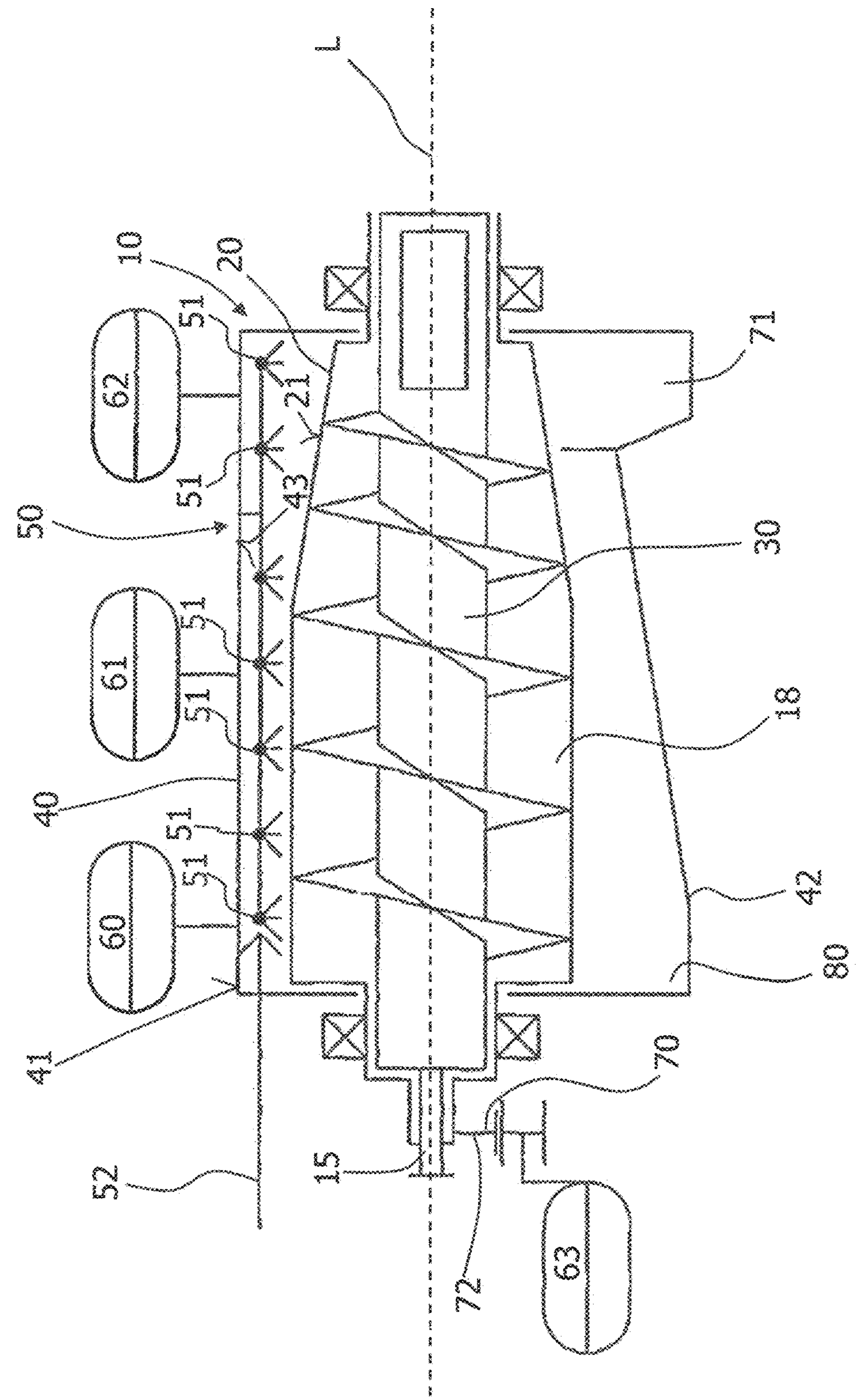

ing of the products, and the temperature in the machine housing (40) is monitored during processing.

15 Claims, 2 Drawing Sheets

(51) Int. Cl.
*B04B 1/20* (2006.01)
*B04B 13/00* (2006.01)

(58) Field of Classification Search
USPC .......................................... 494/10, 12, 13, 14
See application file for complete search history.

(56) References Cited

U.S. PATENT DOCUMENTS

| | | | | |
|---|---|---|---|---|
| 2,765,978 | A | 10/1956 | Strezynski | 494/14 |
| 4,908,048 | A | 3/1990 | Hofmann et al. | 96/196 |

FOREIGN PATENT DOCUMENTS

| | | | | | |
|---|---|---|---|---|---|
| EP | 0058353 | B1 | | 5/1984 | B01D 19/00 |
| ES | 2250684 | T3 | * | 4/2006 | B01D 21/009 |
| SU | 715141 | A1 | * | 2/1980 | B04B 15/02 |
| WO | WO2010101524 | A2 | | 9/2010 | B04B 15/02 |

OTHER PUBLICATIONS

The Notification Concerning Transmittal of International Preliminary Report on Patentability (Chapter I of the Patent Cooperation Treaty), in English, dated Jun. 30, 2022, which was issued by the International Bureau of WIPO in Applicant's corresponding international PCT application having Serial No. PCT/EP2020/086605, filed on Dec. 17, 2020.

The English translation of the International Preliminary Report on Patentability (Chapter I of the Patent Cooperation Treaty), dated May 17, 2022, which was issued by the International Bureau of WIPO in Applicant's corresponding international PCT application having Serial No. PCT/EP2020/086605, filed on Dec. 17, 2020.

The Written Opinion of the International Searching Authority, in English, dated Mar. 12, 2021, which was issued by the International Bureau of WIPO in Applicant's corresponding international PCT application having Serial No. PCT/EP2020/086605, filed on Dec. 17, 2020.

The International Search Report, in English, dated Mar. 12, 2021, which was issued by the International Bureau of WIPO in Applicant's corresponding international PCT application having Serial No. PCT/EP2020/086605, filed on Dec. 17, 2020.

An Office Action (in German), dated Sep. 7, 2020, issued by the German Patent Office for Applicant's related German Patent Application No. DE102019135218.5, filed Dec. 19, 2019.

* cited by examiner

METHOD FOR PROCESSING EXPLOSIVE PRODUCTS IN A SEPARATING MACHINE, AND SEPARATING MACHINE

The invention relates to a method for processing explosive products in a separating machine which comprises a rotary device located in a drum, wherein the drum is located in a machine housing, according to claim 1. Furthermore, the invention relates to a separating machine for performing a method according to the invention for processing explosive products, according to claim 9.

It is known that explosive products, the flashpoint of which is close to the processing temperature, cannot be readily processed in a separating machine, in particular in a solid bowl screw centrifuge or in a separator, in particular when the processing temperature is only by 15 Kelvin lower than the respective specific flashpoint of the product to be processed. According to technical regulations for operational safety (TRBS)-2152, a threshold with respect to the processing temperature in case of pure, non-halogenated liquids is defined to be 5 K below the flashpoint of the liquid. A threshold with respect to the processing temperature in case of solvent mixtures without a halogenated component is defined to be 15 K below the flashpoint.

Due to the resulting or prevailing temperatures during processing and/or at standstill, the flashpoint within the separating machine, in particular within the solid bowl screw centrifuge or the separator can be exceeded so that a dangerous explosive atmosphere might be formed.

In order to be able to process such products, the explosion protection within separating machines, in particular within solid bowl screw centrifuges or separators has hitherto been ensured by methods of inertization. The formation of an explosive atmosphere within the separating machine is thus avoided.

In order to be able to perform such an intertization method, an inertization unit is required which monitors and controls an inert gas supply to the separating machine and the maintenance of the necessary pressures within the separating machine. Thus, the inert atmosphere within the separating machine can be guaranteed.

Such a monitoring places certain requirements on measurement technology. Furthermore, the system periphery of an inertized centrifuge needs to be realized such that the required pressures are maintained and an unintentional escape of gas is avoided.

In summary, the operation of an inertized separating machine is expensive in terms of costs and technology. Moreover, inert gas needs to be provided which in turn involves further dangers such as, for example, people suffocating, and due to that, precautions need to be taken for protecting personnel from this inert gas.

From the aforementioned, it is therefore a task of the present invention to propose a further developed method for processing explosive products in a separating machine, in particular in a solid bowl screw centrifuge or in a separator, which is not such as complex as hitherto known inertization methods. Overall, a method is intended to be provided which can be easily performed and furthermore can be retrofitted in already existing separating machines, in particular solid bowl screw centrifuges and systems, respectively, or separators.

Furthermore, it is a task of the invention to propose a separating machine, in particular a solid bowl screw centrifuge or a separator which serves the purpose of performing a method according to the invention for processing explosive products.

The solution of the task of the invention is performed by a method for processing explosive products in a separating machine, according to the teaching of claim 1. Furthermore, the solution of the task of the invention is performed by a separating machine for performing a method according to the invention, according to the teaching of claim 9.

The subclaims represent at least appropriate configurations and further developments of the method according to the invention or of the separating machine according to the invention.

The method according to the invention for processing explosive products in a separating machine provides for the separating machine to firstly comprise a rotary device located in a drum, wherein the drum itself is located in a machine housing. According to the invention, cooling liquid is directly or indirectly applied, in particular sprayed onto an outer surface of the drum during processing of the products at least onto portions thereof and/or intermittently. Furthermore, the temperature within the machine housing is monitored during processing.

The method according to the invention for processing explosive products in a solid bowl screw centrifuge provides for the solid bowl screw centrifuge to firstly comprises a screw located in a drum, wherein the drum itself is located in a machine housing. According to the invention, cooling liquid is directly or indirectly applied, in particular sprayed onto an outer surface of the drum during processing of the products at least onto portions thereof and/or intermittently. Furthermore, the temperature within the machine housing is monitored during processing.

The method according to the invention for processing explosive products in a separator provides for the separator to firstly comprise a rotary disc stack located in a drum, wherein the drum itself is located in a machine housing. According to the invention, cooling liquid is directly or indirectly applied, in particular sprayed onto an outer surface of the drum during processing of the products at least onto portions thereof and/or intermittently. Furthermore, the temperature within the machine housing is monitored during processing.

It can be recognized that a method according to the invention for processing explosive products in a separating machine is provided which can be likewise applied to solid bowl screw centrifuges and separators.

The outer surface of the drum of a solid bowl screw centrifuge is to be understood to be the surface of the drum which is not formed to be internal, i.e., is not pointing in the direction of the screw. In other words, the outer surface of the drum forms the rotor surface. In solid bowl screw centrifuges, the component group formed of the screw and the drum, is designated to be a rotor.

The outer surface of the drum of a separator is to be understood to be the surface of the drum which is not formed to be internal, i.e., is not pointing in the direction of the disc stack.

Cooling liquid is applied, in particular sprayed onto the outer surface of the drum, at least onto portions thereof during processing of the products.

It is further possible for cooling liquid to be applied, in particular sprayed both onto the surface of the drum and the inner surfaces of the machine housing during processing of the products at least onto portions thereof and/or intermittently.

According to the invention, cooling liquid is predominantly, in particular exclusively applied, in particular sprayed onto the outer surface of the drum of the separating machine. Directly cooling the product to be processed and/or the rotary device, in particular of the screw or the disc stack, is usually not necessary, preferably not necessary at all.

In this case, in particular cooling liquid is applied, in particular sprayed onto the outer surface of the drum and/or the inner surfaces of the machine housing of a solid bowl screw centrifuge at least in portions, which cooling liquid surrounds the upper half of the screw in case of an imaginary division of the screw along the longitudinal axis.

In this case, in particular cooling liquid is applied, in particular sprayed onto the outer surface of the drum and/or the inner surfaces of the machine housing of a separator at least in portions, which cooling liquid concerns the upper portion of the drum housing in case of an imaginary division of the drum housing along a horizontal axis.

In a further embodiment of the invention, it is possible for cooling liquid to be applied, in particular sprayed onto the outer surface of the drum over the complete circumference and/or onto the inner surfaces of the machine housing over the complete inner surfaces.

Due to cooling liquid being applied, in particular sprayed onto the outer surface of the drum and simultaneously monitoring the temperature within the machine housing during processing of the product, a method for processing explosive products is provided which can be performed without any inertization process. This concerns in particular the processing of products, the processing temperature of which is relatively slightly below the flashpoint. It is in particular possible for the processing temperature to be lower than the flashpoint by only 5 Kelvin.

Surprisingly, it has been shown that the formation of an explosive atmosphere within the centrifuge can be prevented in that during processing of the explosive product, components getting in contact with the product are directly cooled.

Due to cooling the outer surface of the drum, the formation of an explosive atmosphere is avoided in that the flashpoint is prevented from being exceeded.

In turn, it has been shown that with respect to heating the product to be processed within the drum, the products remaining in the drum are decisive for additional material heating. The large part of the product flow conducted through the separating machine, in particular through the solid bowl screw centrifuge or the separator, receives little temperature due to the relative short dwelling time, when the throughflow is sufficient. Therefore, cooling the outer surfaces of the drum and/or the inner surfaces of the machine housing result/s in a sufficiently low temperature of the product located within the separating machine.

The cooling liquid preferably gets in contact with the product to be processed or the processed product at most to a small extent. The cooling liquid may be selected according to the product to be processed. In a preferred embodiment of the invention, the cooling liquid is cooling water.

Spraying the outer surface of the drum may preferably then be taken as a basis when the separating machine has a spraying system with several spraying nozzles as a cooling device.

An application of cooling liquid may be performed within such cooling devices that have cooling tubes, for example. Such cooling tubes can be installed around the outer surface of the drum.

In a further embodiment of the invention, the cooling device may be designed such that an intermediate space is formed in the separating machine. Such an intermediate space is preferably formed between the outer surface of the drum and a housing portion spaced from the outer surface of the drum. Cooling liquid can circulate in this intermediate space. In other words, cooling liquid can flow in a double-walled drum housing. Consequently, it is possible that a direct or indirect application of cooling liquid onto the outer surface of the drum is performed.

In a further embodiment of the invention, it is provided for the maximum temperature of the cooling liquid to be regulated. The temperature of the cooling liquid is regulated to a maximum temperature which is slightly below the admissible processing temperature of the product. The cooling liquid preferably is regulated to a maximum temperature of 35° C., in particular 30° C., in particular 25° C.

In most cases, this means that in Central Europe's normal environmental temperatures the cooling liquid does not need to be cooled to a large extent. Only in case of higher environmental temperatures, slight cooling of the cooling liquid is necessary.

Due to cooling the cooling liquid, the influence of increased environmental temperatures upon the temperature increase within the separating machine is reduced.

In a further embodiment of the invention, it is possible for the maximum temperature of the cooling liquid located in a tank to be regulated. It is possible for the separating machine or the cooling device associated with the separating machine to have a tank, in particular a reservoir tank, wherein the cooling liquid is stored or buffered in this tank.

Regulating the maximum temperature of the cooling liquid located in a tank enables a particularly exact cooling of the outer surface of the drum. Regulating the temperature of the cooling liquid located in the tank is preferably performed on the basis of temperature monitoring of the cooling liquid located in the tank. Due to such a temperature monitoring and a corresponding regulation of the maximum temperature of the cooling liquid in a tank, a sufficient temperature difference can be provided.

In monitoring the cooling liquid located in a tank, it is inter alia taken into account that a corresponding heating of the cooling liquid takes place already due to the circulation of cooling liquid in a cooling device.

A Cooling liquid inflow and/or spraying nozzles is/are activated in temporal intervals, and cooling liquid is distributed, preferably via spraying nozzles, within the machine housing, and preferably in portions on inner sides of the machine housing.

Upon detecting a first temperature threshold value in the machine housing and/or in a liquid phase outflow, the cooling liquid inflow and/or spraying nozzles is/are activated.

Consequently, it is possible that an application, in particular spraying, of the drum at least onto portions thereof during processing of the products, is not performed during the complete processing time. The application, in particular spraying, of the drum, and thus a cooling process may only be started after a first temperature threshold value has been detected, for example. This enables cooling liquid to be saved, since this is only used if it becomes necessary due to detected temperatures.

Moreover, it is possible for such a first temperature threshold value to be specified and/or such a machine adjustment to be made that the cooling liquid being applied, in particular spraying onto the drum is performed during the complete processing time. This is in particular advantageous when the separating machine is used in high environmental temperatures or a particularly explosive product should be processed.

Furthermore, it is possible for the temperature of a centrate, i.e., the liquid phase separated from the product, generated by the separating machine, in particular by the solid bowl screw centrifuge or the separator, to be monitored. Such a monitoring of the centrate determines temperature increases of the product during processing at an early stage. When an admissible centrate temperature is exceeded, it is possible to stop the supply of products to be processed in the separating machine, in particular the solid bowl screw centrifuge or the separator. In a separator, this may comprise both the heavy liquid phase and the light liquid phase.

Upon detecting a second temperature threshold value, which is higher than the first temperature threshold value, it is possible for a supply of the product to be processed in the separating machine, in particular the solid bowl screw centrifuge or the separator, to be stopped in the machine housing and/or in the liquid phase outflow, and to pump in particular cooled liquid into the drum or into the separating space of the separating machine.

The supply of liquid, in particular cooling liquid, into the drum of a solid bowl screw centrifuge or a separator preferably takes place via the inlet tube through which the product to be processed is usually supplied to the drum. Supplying of liquid preferably is performed for such a long time until the temperature value detected in the machine housing has dropped again below the second temperature threshold value.

Due to stopping the supply of a product to be processed and supplying of liquid, an explosive atmosphere is prevented from being formed. This is due to the fact that no product to be processed and potentially being explosive continues to flow into the drum, and the flashpoint of the product still located in the separating machine is diluted due to the dilution with liquid, in particular cooling liquid.

Upon detecting a third temperature threshold value, which is greater or higher than the second temperature threshold value, the separating machine, in particular the solid bowl screw centrifuge or the separator, preferably is switched off. In other words, the solid bowl screw centrifuge or the separator is shut down with regard to safety, when the third temperature threshold value is reached. Switching on of the solid bowl screw centrifuge or the separator preferably should be enabled only when the temperature(s) detected in the machine housing and/or in the liquid phase outflow has or have dropped below the second temperature threshold value.

It is furthermore possible for the cooling liquid, when the second temperature threshold value is detected, to be itself cooled in such a manner that the maximum temperature of the cooling liquid has a lower value than it was specified prior to detecting the first temperature threshold value. In other words, a regulation of the cooling liquid temperature may be performed in dependence of the temperature(s) detected in the machine housing. In particular, when a second temperature threshold value and/or a third temperature threshold value are or is detected, a corresponding regulation of the maximum temperature of the cooling liquid can cause the explosive product located in the drum to be correspondingly cooled.

It is furthermore possible for the detection of a second temperature threshold value to be performed in combination with the detection of a temperature value of the cooling liquid located in a tank. The regulation of the cooling liquid temperature, in particular the regulation of the temperature of the cooling liquid may be performed due to detecting the temperature in the machine housing and/or in the liquid phase outflow as well as by additionally detecting the cooling liquid temperature in the tank.

It is furthermore possible for the throughput of the product to be processed in the separating machine to be performed in dependence of detected temperature values. It is possible for the product supply to be stopped when the admissible centrate temperature is exceeded so as to prevent the product located in the drum to be further heated. It is furthermore possible for the product temperature itself and/or the throughflow amount to be regulated in dependence of the centrate temperature. When a throughflow amount is too small, the heat input into the product during processing is higher and can result in the second or third temperature threshold value to be exceeded.

In a preferred embodiment of the invention, the cooling liquid is collected after the application, in particular after the spraying, in the machine housing, and is subsequently used again for application, in particular spraying. A cooling liquid circuit can be formed, which after being applied, in particular sprayed, onto the outer surface of the drum provides for the drained off cooling liquid to be collected and subsequently to be applied, in particular sprayed. It is possible for the cooling liquid to be examined for pollutions prior to the repeated use, so that the cooling liquid can be optionally purified.

It can be seen that the proposed method according to the invention can be implemented and handled in an extremely simple manner. Inert gases are not needed to be used. Thus, the dangers associated with the use of inert gases are omitted.

It has shown that the method according to the invention can be particularly well used in processing alcoholic products or oil sludge media. The alcoholic products may be inter alia potable alcohol products.

A further aspect of the invention is related to a separating machine for performing the method according to the invention. The separating machine has a rotary device located in a drum, wherein the drum is located in a machine housing.

According to the invention, a cooling device, in particular a spraying system with several spraying nozzles is formed in the machine housing, wherein the cooling device, in particular one of the spraying nozzles, is directed towards the outer surface of the drum or is arranged such that cooling liquid can be directly or indirectly applied onto the outer surface of the drum. In addition, at least one temperature monitoring unit is formed in the machine housing.

A further aspect of the invention is related in particular to a solid bowl screw centrifuge for performing the method according to the invention. The solid bowl screw centrifuge has a screw located in a drum, wherein the drum is located in a machine housing. According to the invention, a cooling device, in particular a spraying system with several spraying nozzles, is formed in the machine housing, wherein the cooling device, in particular at least one of the spraying nozzles, is directed towards the outer surface of the drum or is arranged such that cooling liquid can be applied directly or indirectly onto the outer surface of the drum. In addition, at least one temperature monitoring unit is formed in the machine housing.

A further aspect of the invention is related in particular to a separator for performing the method according to the invention. The separator has a rotary disc stack located in a drum, wherein the drum is located in a machine housing. According to the invention, a cooling device, in particular a spraying system with several spraying nozzles, is formed in the machine housing, wherein the cooling device, in particular at least one of the spraying nozzles, is directed towards the outer surface of the drum or is arranged such that cooling liquid can be applied directly or indirectly onto the outer surface of the drum. In addition, at least one temperature monitoring unit is formed in the machine housing.

The solid bowl screw centrifuge according to the invention can be both a two-phase solid bowl screw centrifuge and a three-phase solid bowl screw centrifuge.

The separator according to the invention can be both a two-phase separator and a three-phase separator.

The cooling device may be, for example, such a device which has cooling tubes. Such cooling tubes may be arranged on the surface of the drum. In such a case, cooling liquid is indirectly applied onto the outer surface of the drum.

In a further embodiment of the invention, the cooling device is formed as an intermediate space formed in the machine housing, wherein cooling liquid can circulate in the intermediate space, and the intermediate space is formed by at least one outer surface of the drum and a further housing portion spaced from the outer surface. In such an embodiment of the invention, cooling liquid can directly be applied onto the outer surface of the drum. A kind of double-walled housing is formed into which the cooling medium can be introduced continuously. In other words, it is possible for the drum to have a double-walled drum housing, wherein cooling liquid can flow due to the intermediate space being formed by double walls. The advantage of such an embodiment of the invention is that cooling liquid is extensively applied onto the outer surface of the drum. Furthermore, no targeted arrangement of the cooling device needs to be performed, since cooling liquid can be applied onto almost the complete surface of the drum.

Preferably, the spraying nozzles are formed in an upper side or in a region of an upper side of the machine housing or in the region of a cover surface of the machine housing.

Due to the arrangement of the spraying nozzles, it is moreover possible that cooling liquid, at least in portions, can be sprayed onto the inner side of the machine housing.

Such an arrangement of the spraying nozzles enables cooling liquid to be sprayed in particular onto the outer surface of a solid bowl screw centrifuge which is located in the upper part in an imaginary division of the screw along the longitudinal axis of the screw.

In forming a separator according to the invention, at least one of the spraying nozzles can be arranged in the machine housing such that cooling liquid is sprayed onto the upper portion of the drum housing in an imaginary division of a drum housing along a horizontal axis. The horizontal axis preferably is located on the level of outlet openings, in particular the outlet nozzles of the separator.

For increasing the cooling amount, it is furthermore possible for the spraying nozzles to be arranged in the entire machine housing, so that cooling liquid can be sprayed onto the drum also laterally and/or from below. In other words, the spraying nozzles can be arranged such that a fully complete cooling of the outer surface of the drum is enabled.

In an embodiment of a separator according to the invention, at least one spraying nozzle can moreover be formed in the area of a fixing web along which the solid matter discharge usually flows.

For example, such a fixing web is designed to be double-walled, so that at least one spraying nozzle can be arranged in the double-walled construction. Alternatively, or additionally, it is possible for at least one spraying nozzle to be arranged in the machine housing such that it is directed from outside to the area of the in particular double-walled fixing web. Since in particular in the area of the fixing web, increased temperatures can be expected in conjunction with the solid matter discharge, the arrangement of at least one spraying nozzle is particularly advantageous.

The temperature monitoring unit may be formed in the simplest case by a temperature sensor. Furthermore, it is possible for a temperature monitoring unit to additionally have a computing unit. In a further embodiment of the invention, it is possible for several sensors to be connected to a single computing unit.

It is possible for a temperature monitoring unit and/or a device for cooling the cooling liquid to be formed in a tank for storing the cooling liquid. The temperature monitoring unit of the tank for storing the cooling liquid may be connected to the temperature monitoring unit of the machine housing. Furthermore, it is possible for the temperature monitoring unit of the tank for storing the cooling liquid to be a unit associated with the temperature monitoring unit of the machine housing.

By means of a device for cooling the cooling liquid, it is possible for the cooling liquid located in the tank to be cooled. Such a cooling may be performed, for example, in the event of rising outdoor temperatures or rising environmental temperature as well as when various threshold values are reached in the machine housing.

In a liquid phase outflow or in the area of the centrate outlet of the separating machine, in particular the solid bowl screw centrifuge or the separator, a further temperature monitoring unit may be formed. By means of this temperature monitoring unit, the centrate temperature or the temperature of the liquid phase separated by the separating machine, in particular the solid bowl screw centrifuge or the separator, can be determined and/or monitored.

If the separating machine according to the invention is a separator, in particular a three-phase separator, one temperature monitoring unit may in each case be formed in the area of the light liquid phase exit and in the area of the heavy liquid phase exit.

Furthermore, it is possible in conjunction with a separator according to the invention for the temperature to be detected in a solid matter cyclone. Solid matter separated or generated by the separator usually is transported in a solid matter cyclone.

It is furthermore possible for a collecting and returning device for used cooling liquid to be formed in the machine housing. It is possible for a purification unit to be formed in this collecting and returning device. The collected cooling liquid may thus be purified again before being reused. A detection unit for determining a degree of pollution of the cooling liquid is also possible.

Due to the device according to the invention and the method according to the invention, such an explosive product can be processed in a separating machine, in particular a solid bowl screw centrifuge or a separator, for example, which has a flashpoint of >44° C. Also processing of explosive products which have an even lower flashpoint is possible by correspondingly adapting the method and/or the separating machine.

In particular, materials of the explosion group IIA or IIB can be processed. Furthermore, processing of temperature classes T1-T4 can take place.

It is possible, when an explosive product is processed, changed, i.e., increased processing temperatures as compared to the state of the art can be worked with.

In mixtures having an inflammable component, the processing temperature may be: flashpoint of the mixture −9 Kelvin. In other words, the processing temperature may have such a value which is by at least 9 Kelvin lower than the flashpoint of the product to be processed.

In mixtures or products having several inflammable components, the processing temperature may be: flashpoint minus 19 Kelvin. In other words, the processing temperature may have such a value which is by at least 19 Kelvin lower than the flashpoint of the product to be processed.

It is in particular possible for the separating machine according to the invention to be used for processing alcoholic products or for processing oil sludge media. The alcoholic products may be inter alia potable alcohol products.

The solid bowl screw centrifuge according to the invention can be operated in Zone 2 IIB T4.

Hereinafter, the method according to the invention as well as the associated separating machine according to the invention will be described in more detail on the basis of schematic representations.

Shown are in:

FIG. 1 a solid bowl screw centrifuge according to the invention; and

Figure 2:
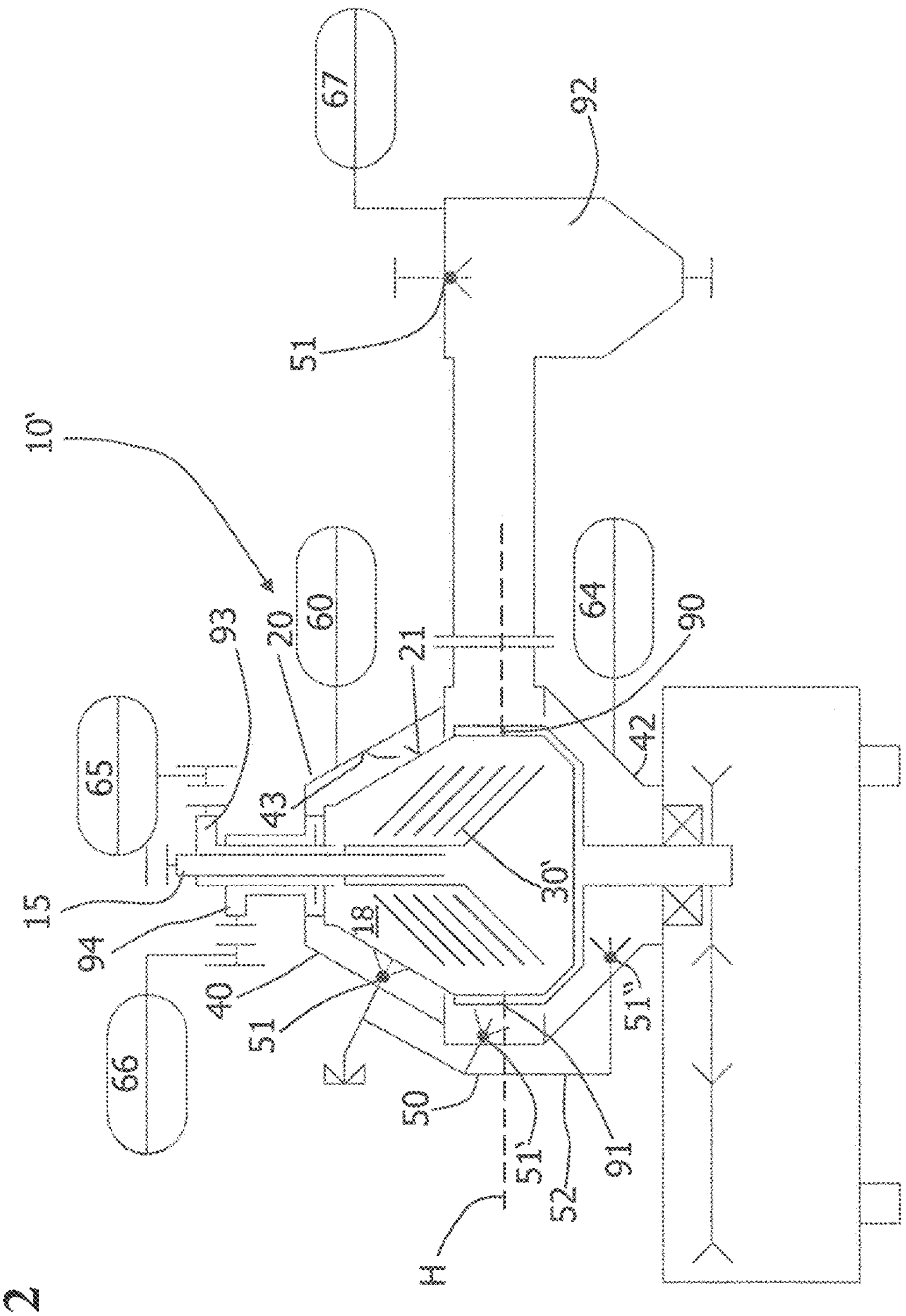

FIG. 2 a separator according to the invention.

In the following, the same reference numerals will be used for equal components and components of equal action.

The solid bowl screw centrifuge 10 represented in FIG. 1 comprises a screw 30 located in a drum 20. The component group, which comprises both the drum 20 and the screw 30, is generally referred to as a rotor. The rotor is characterized in that both the drum 20 and the screw 30 are rotating.

The drum 20 and the rotor, respectively, are located in a machine housing 40. In the machine housing 40, in particular in the area of the cover side 41 of the machine housing 40, a spraying system 50 is located. The spraying system 50 has several spraying nozzles 51. The spraying nozzles 51 are directed towards the drum 20 in such a manner that cooling liquid, in particular cooling water, can be sprayed onto the outer surface 21 at least in portions.

Preferably, the spraying nozzles 51 are oriented such that spraying onto the upper half of the outer surface 21 of the drum is enabled. As the upper half, the half of the drum 20 or of the outer surface 21 is to be understood, which is formed in an imaginary section through the longitudinal axis L of the screw. Since the drum 20 rotates in processing a product, the complete or almost the complete outer surface of the drum 20 is cooled during processing.

The spraying nozzles 51 are distributed within the machine housing such that the cooling liquid impinges onto the inner sides 43 of the machine housing 49 also in portions.

Additionally, it is possible for such spraying nozzles to be used, which are also arranged in the bottom side 42 of the machine housing 40 so that a simultaneous fully complete spraying onto the outer surface 21 of the drum 20 is enabled during processing of the product. If spraying nozzles are intended to be formed in the area of the bottom side 42 of the machine housing 40, these possibly need to be operated at a higher pressure so that cooling of the outer surface 21 is possible.

Furthermore, it can be recognized that the solid bowl screw centrifuge 10 is formed having several temperature monitoring units 60-63. The temperature monitoring units 60-62 determine the temperatures in the machine housing 40 in this case. The temperature monitoring unit 63 detects or monitors the temperature of the centrate 70 generated by the solid bowl screw centrifuge 10.

For processing explosive products, these products are transported into the drum inner space 18 via the inlet tube 15. In the drum inner space 18, which can also be referred to as a separating space, separation of the explosive product into a solid matter as well as a centrate 70 takes place.

The solid matter is correspondingly evacuated via a solid matter outlet 71 (only illustrated schematically). During processing of the explosive product, cooling liquid is sprayed onto the outer surface 21 of the drum 20 by means of the spraying system 50. At the same time, detecting or monitoring of the temperature in the machine housing 40 is performed. In the present example, this is performed via the temperature monitoring units 60, 61, and 62.

It is possible for the cooling liquid used in the spraying system 50 to be regulated with respect to the temperature. A regulation to a maximum temperature of 25° C. is performed in particular.

Additionally, the temperature of the centrate 70 is monitored by means of the temperature monitoring unit 63.

When a first temperature threshold value is detected in the machine housing 40 and/or in the liquid phase outflow 72, in which the centrate 70 is transported, supply of the product to be processed in the solid bowl screw centrifuge 10 preferably is stopped, and cooling liquid, in particular water, is introduced or pumped into the drum 20. The water is transported into the drum inner space 18 via the inlet tube 15. This results in the product to be temporarily cooled and diluted in the drum inner space 18. Dilution of the product causes the flashpoint of the product to increase.

Upon detecting a second temperature threshold value, which is higher than the first temperature threshold value, the solid bowl screw centrifuge 10 is preferably switched off.

Alternatively, or complementarily, it is possible for the cooling liquid itself, upon detecting a/the second temperature threshold value, to be additionally or alternatively cooled such that the maximum temperature of the cooling liquid has a lower value than this was specified before the first temperature threshold value was detected. Cooling or temperature regulation of the cooling liquid preferably is performed in the cooling liquid inlet 52 of the spraying system 50.

After spraying in the machine housing 40, cooling liquid can be collected by means of a collecting and returning device 80 and subsequently be transported to the cooling liquid inlet 52. This enables cooling liquid to be used in a solid bowl screw centrifuge 10 in a resource-friendly manner.

In FIG. 2, a further embodiment of a separating machine, namely an embodiment of a separator 10' is illustrated. The illustrated separator 10' is a 3-phase separator. The method according to the invention or the device according to the invention, however, can also be applied to 2-phase separators.

In a drum 20, a rotatable disc stack 30' is arranged. The drum 20 is located in the machine housing 40 together with the disc stack 30'. A spraying system 50 is located at least in part in the machine housing 40. The spraying system 50 has several spraying nozzles 51.

One spraying nozzle 51 is arranged in this case such that spraying onto an upper portion of the outer surface 21 of the drum 20 is enabled. As the upper portion, the portion of the drum 20 or the outer surface 21 is to be understood, which is formed in case of an imaginary section through the horizontal axis H of the drum 20. The horizontal axis H extends in particular on the level of the outlet openings 90 formed in particular as outlet nozzles.

Since the drum 20 is rotating when the product is processed, the upper portion of the outer surface of the drum 20 is completely or almost completely cooled during processing.

According to the embodiment of FIG. 2, such a spraying nozzle 51' is additionally formed to be directed to the area of the web 91. The separated solid matter is in particular transported along the web 91. In the area of the web, increased temperatures are thus to be expected in particular.

A further exemplary spraying nozzle 51" is arranged in the area of the lower portion or the bottom side 41 of the machine housing 40. Accordingly, the spraying nozzle 51" is oriented such that cooling liquid can be applied onto a lower portion of the drum 20.

The separated solid matter preferably gets into a solid matter cyclone 92. In this solid matter cyclone 92 as well, a spraying nozzle 51 may be formed. This also prevents an already separated solid matter from ignition/explosion during temporary storage in the solid matter cyclone 92.

It can be recognized that the separator 10' is formed having several temperature monitoring units 60, and 64-67. The temperature monitoring unit 60 determines in this case the temperature in the machine housing 40, in particular in the area above the horizontal axis H.

Furthermore, a temperature monitoring unit 64 is formed in the area of the bottom side 42 of the machine housing.

Furthermore, a temperature monitoring unit 66 is formed in the area of the heavy liquid phase outflow 94, and a temperature monitoring unit 65 is formed in the area of the light phase outflow 93.

In other words, the temperature monitoring unit 66 detects the temperature of the heavy liquid phase generated by the separator 10'. The temperature monitoring unit 65 detects or monitors the temperature of the light liquid phase generated by the separator 10'.

For processing explosive products, these products are transported into the drum inner space 18 via the stationary inlet tube 15. In the drum inner space 18, which can also be referred to as a separating space, a separation of the explosive product into a solid matter, a light liquid phase, as well as a heavy liquid phase takes place.

During processing of the explosive product, cooling liquid is sprayed at least intermittently onto the outer surface 21 of the drum by means of the spraying system 50. At the same time, detecting or monitoring of the temperature in the machine housing 40 is performed.

It is possible for the cooling liquid used in the spraying system 50 to be regulated with respect to the temperature. A regulation to a maximum of 25° C., for example, is performed in particular. In addition, the temperature of the solid matter is monitored in the area of the bottom side 42 of the machine housing 40. Temperature monitoring by means of the temperature monitoring unit 67 in the area of the solid matter cyclone 92 is advantageous, as well.

Detecting temperature threshold values, in particular a first, a second, and a third temperature threshold value, and the therewith related regulation of the operation of the separator 10' substantially corresponds to the method in conjunction with the solid bowl screw centrifuge 10. Consequently, it is also possible for cooling liquid to be transported into the drum inner space 18 via the inlet tube 15, when a second temperature threshold value has been detected. This results in the product to be cooled and diluted temporarily in the drum inner space. Diluting the product causes the flashpoint of the product located in the drum inner space 18 to increase.

Upon detecting a third temperature threshold value, which is higher than the second temperature threshold value, the separator 10' preferably is switched off.

In conjunction with the separator 10', as well, the cooling liquid, after spraying in the machine housing 40, may be collected by means of a collecting and returning unit (not illustrated), and subsequently may be transported to the cooling liquid inlet 52. Due to that, an environmentally friendly use of cooling liquid can be enabled in a separator 10'.

Incidentally, the same explanations apply as in conjunction with the solid bowl screw centrifuge 10.

LIST OF REFERENCE NUMERALS

10 solid bowl screw centrifuge
10' separator
15 inlet tube
18 drum inner space/separating space
20 drum
21 outer surface
30 screw
30' disc stack
40 machine housing
41 cover side
42 bottom side
43 inner side
50 spraying system
51, 51', 51" spraying nozzle
52 cooling liquid inflow
60-63 temperature monitoring unit
64-67 temperature monitoring unit
70 centrate
71 solid matter outlet
72 liquid phase outflow
80 collecting and returning device
90 outlet opening
91 web
92 solid matter cyclone
93 light liquid phase outflow
94 heavy liquid phase outflow
H horizontal axis
L longitudinal axis

The invention claimed is:

1. A method for processing explosive products in a separating machine, which comprises a rotary device located in a drum (20), wherein the drum (20) is located in a machine housing (40), wherein cooling liquid is directly or indirectly applied onto the outer surface (21) of the drum (20) at least onto portions thereof and/or intermittently during processing of the products, and the temperature in the machine housing (40) is monitored during processing, wherein a cooling liquid inflow (52) and/or spraying nozzles (51) is/are activated in temporal intervals, and cooling liquid is distributed within the machine housing (40), characterized in that upon detecting a first temperature threshold value in the machine housing (40) and/or in a liquid phase outflow (72), the cooling liquid inflow (52) and/or spraying nozzles (51) is/are activated, wherein upon detecting a second temperature threshold value, which is higher than the first temperature threshold value, a supply of the explosive product to be processed in the separating machine is stopped in the machine housing (40) and/or in the liquid phase outflow (72) and liquid is supplied into the drum (20).

2. The method according to claim 1, characterized in that a maximum temperature of the cooling liquid is regulated.

3. The method according to claim 2,
characterized in that
the maximum temperature of the cooling liquid is regulated to a maximum temperature of 35° C.

4. The method according to claim 1,
characterized in that
upon detecting a third temperature threshold value, which is higher than the second temperature threshold value, the separating machine is switched off.

5. The method according to claim 1,
characterized in that
upon detecting the second temperature threshold value, the cooling liquid is cooled itself such that a maximum temperature of the cooling liquid has a lower value than this was specified and/or regulated before the first temperature threshold value was detected.

6. The method according to claim 1,
characterized in that
the cooling liquid is collected after the application in the machine housing (40), and is subsequently used again for cooling.

7. A separating machine for performing a method according to claim 1 for processing explosive products, wherein the separating machine has a rotary device located in a drum (20), wherein the drum (20) is located in a machine housing (40),
characterized in that
a cooling device is formed in the machine housing (40), wherein the cooling device is directed towards at least one outer surface (21) of the drum (20) or is arranged such that the cooling liquid can be applied onto the at least one outer surface (21) of the drum (20), and furthermore, at least one temperature monitoring unit (60) is formed in the machine housing (40).

8. The separating machine according to claim 7,
characterized in that
the cooling device is designed as an intermediate space formed in the machine housing (40), wherein the cooling liquid is circulable in the intermediate space, and the intermediate space is formed by the at least one outer surface (21) of the drum (20) and a further housing portion spaced from the at least one outer surface (21).

9. The separating machine according to claim 7,
characterized in that
a tank for storing the cooling liquid has a temperature monitoring unit and/or a device for cooling the cooling liquid.

10. The separating machine according to claim 7,
characterized in that
in a liquid phase outflow (72, 93, 94), a temperature monitoring unit (63, 65, 66) is formed.

11. The separating machine according to claim 7,
characterized in that
in the machine housing (40), a collecting and returning device (80) for used cooling liquid is formed.

12. The separating machine according to claim 7,
characterized in that
the separating machine is a solid bowl centrifuge.

13. The separating machine according to claim 12,
characterized in that
the rotary device is a screw.

14. The separating machine according to claim 12,
characterized in that
the rotary device is a disc stack.

15. The separating machine according to claim 7,
characterized in that
the separating machine is a separator.

* * * * *